(12) United States Patent
Cheng (10) Patent No.: US 11,423,184 B2
(45) Date of Patent: Aug. 23, 2022

(54) INFORMATION PROCESSING METHOD, INFORMATION PROCESSING DEVICE, AND ELECTRONIC DEVICE

(71) Applicant: Lenovo (Beijing) Co., Ltd., Beijing (CN)

(72) Inventor: Guojing Cheng, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 305 days.

(21) Appl. No.: 16/584,868

(22) Filed: Sep. 26, 2019

(65) Prior Publication Data

US 2020/0104540 A1    Apr. 2, 2020

(30) Foreign Application Priority Data

Sep. 30, 2018 (CN) .......................... 201811156969.2

(51) Int. Cl.
*G06F 21/84* (2013.01)
*G06F 21/31* (2013.01)
*G06F 21/45* (2013.01)
*G06F 21/60* (2013.01)

(52) U.S. Cl.
CPC .............. *G06F 21/84* (2013.01); *G06F 21/31* (2013.01); *G06F 21/45* (2013.01); *G06F 21/60* (2013.01)

(58) Field of Classification Search
CPC .......... G06F 21/84; G06F 21/45; G06F 21/60; G06F 21/31
See application file for complete search history.

(56) References Cited

U.S. PATENT DOCUMENTS

| 2007/0150842 A1* | 6/2007 | Chaudhri | G06F 21/36 715/863 |
| 2009/0228820 A1* | 9/2009 | Kim | G06F 3/04886 715/769 |
| 2009/0249247 A1* | 10/2009 | Tseng | G06F 3/0481 715/808 |
| 2013/0135227 A1* | 5/2013 | Rhee | G06F 3/04883 345/173 |
| 2013/0152018 A1* | 6/2013 | Chuang | G06F 3/04883 715/823 |
| 2014/0240244 A1* | 8/2014 | Chiu | G06F 3/017 345/173 |
| 2018/0341389 A1* | 11/2018 | Kim | H04W 52/028 |

FOREIGN PATENT DOCUMENTS

| CN | 103064684 A | 4/2013 |
| CN | 104571838 A | 4/2015 |
| CN | 105653924 A | 6/2016 |
| CN | 106650390 A | 5/2017 |

* cited by examiner

*Primary Examiner* — Tongoc Tran
(74) *Attorney, Agent, or Firm* — Anova Law Group, PLLC (57) ABSTRACT

An information processing method, an information processing device, and an electronic device are provided. The method includes: obtaining an input operation; in response to the input operation being performed on a first object displayed in a first region of a display region, collecting first operation information and making the first object respond to the input operation according to the first operation information; and in response to the input operation being performed on a second object displayed in a second region of the display region, collecting second operation information, and making the second object respond to the input operation according to the second operation information and authentication information corresponding to the second operation information.

18 Claims, 3 Drawing Sheets

INFORMATION PROCESSING METHOD, INFORMATION PROCESSING DEVICE, AND ELECTRONIC DEVICE

CROSS-REFERENCES TO RELATED APPLICATION

This application claims the priority of Chinese Patent Application No. 201811156969.2, filed on Sep. 30, 2018, the content of which is incorporated herein by reference in its entirety.

TECHNICAL FIELD

The present disclosure generally relates to the field of electronic technologies and, more particularly, relates to an information processing method, an information processing device, and an electronic device.

BACKGROUND

Electronic devices such as mobile phones or tablets generally operate in a same way for different objects during use, and the different objects generally respond in a same way to users' input operations. In some examples, when performing operations on the different objects, it is unnecessary to perform an information authentication. In some other examples, when performing operations on the different objects, it is necessary to pass an information authentication to operate the objects. Operation modes and information authentication modes of the electronic devices for the different objects are relatively singularized, and cannot satisfy users' demanding on intelligentization of the electronic devices and diversification of the operation modes of the electronic devices. The use experience is thus reduced.

Thus, there is a need to provide an information process method, an information processing device and an electronic device with improved use experience.

SUMMARY

One aspect of the present disclosure provides an inform ion processing method. The method includes: obtaining an input operation; in response to the input operation being performed on a first object displayed in a first region of a display region, collecting first operation information and making the first object respond to the input operation according to the first operation information; and in response to the input operation being performed on a second object displayed in a second region of the display region, collecting second operation information, and making the second object respond to the input operation according to the second operation information and authentication information corresponding to the second operation information.

Another aspect of the present disclosure provides an information processing device. The device includes a collector, a memory and a processor. The collector obtains an input operation and collects authentication information. The memory is configured to store instructions according to an information process method. In response to the input operation being performed on the first object displayed in the first region, the processor collects the first operation information and makes the first object respond to the input operation according to the first operation information. In response to the input operation being performed on the second object displayed in the second region, the processor collects the second operation information, and makes the second object respond to the input operation according to the second operation information and the authentication information corresponding to the second operation information.

Another aspect of the present disclosure provides an electronic device. The device includes: a first collector for obtaining an input operation; a second collector for collecting authentication information; a display device used for the display of a first object in a first region and a second object in a second region; and a processor for responding to the input operation. In response to the input operation being performed on the first object displayed in the first region, the processor collects the first operation information and the first object responds to the input operation according to the first operation information. In response to the input operation being performed on the second object displayed in the second region, the processor collects the second operation information, and the second object responds to the input operation according to the second operation information.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to some disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all the embodiments of the present disclosure. Based on the disclosed embodiments, persons of ordinary skill in the art may derive other embodiments consistent with the present disclosure, all of which are within the scope of the present disclosure.

Figure 1:
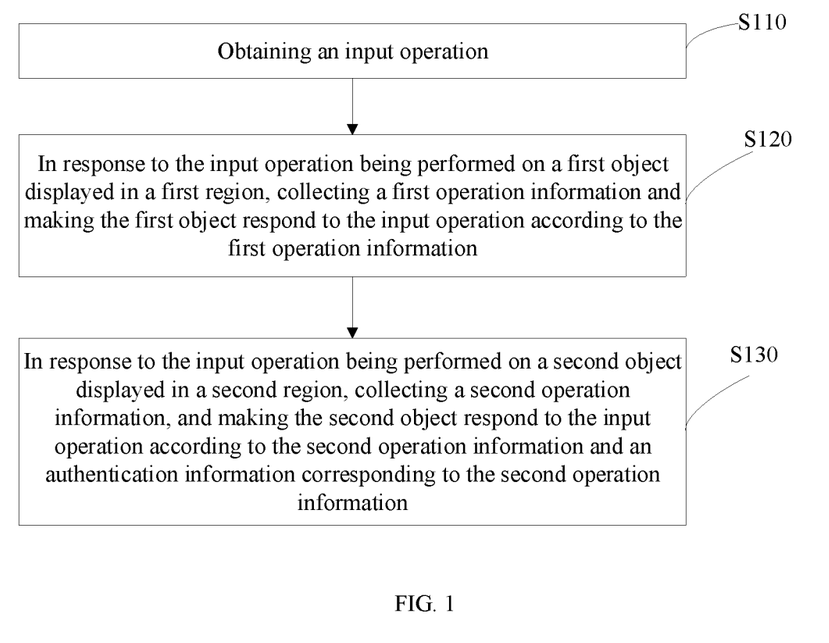
FIG. 1 illustrates an information processing method according to some embodiments of the present disclosure.

The present disclosure provides an information process method. As illustrated in FIG. 1, the information process method may include:

S110: obtaining an input operation;

S120: in response to the input operation being performed on a first object in a first region, collecting first operation information and making the first object respond to the input operation based on the first operation information; and S130: in response to the input operation being performed on a second object in a second region, collecting second operation information and making the second object respond to the input operation based on the second operation information.

In response to the input operation being performed on the first object, the first operation information showing that a user information authentication is unnecessary and the input operation can be responded directly, may be collected. This means the first operation information may show that it may be unnecessary for the first object to perform the user information authentication and the first object may respond to the input operation directly. In response to the input operation being performed on the second object, the second operation information showing that the input operation can be responded after the user information authentication is passed may be collected. This means the second operation information may show that the second object may respond to the input operation after the user information authentication is passed. Correspondingly, when the electronic device performs the second operation information, authentication information corresponding to the second operation information may be collected. The authentication information may include fingerprint information, human face information, and/or any suitable type(s) of biometric information. The user information authentication may be passed when the authentication information matches preset user information.

In some embodiments, the operated objects may be functions that the electronic device itself has, or may be applications added by the user to the electronic device.

The first region may be used to display the first object and the first object may be an object that is not related to personal information and privacy of a user. The first object may be a function that the electronic device itself has, such as a camera function, a dialing function, a calendar function. The first object may also be an application that is installed by the user and that does not include the user's personal information or the user privacy such as a weather application, a map application, and an image processing application. Since the object does not include the user's personal information or the user privacy, after collecting the input operation, when the input operation is determined to be performed on the first object, the first operation information showing that a user information authentication is unnecessary and the input operation can be responded directly may be achieved to make the first object response to the input operation directly without performing the user information authentication.

The second region may be used to display the second object. The second object may be relevant to the user's personal information, privacy, and/or property security. The second object may be a function that the electronic device itself has, such as an album function, a message function, or a notebook function. The second object may also be an application that is installed by the user and that is relevant to the user's personal information, the user privacy, and/or property security, such as a social application, a game application, a payment application, a shopping application, or a financial application. Since the second object may be relevant to the user's personal information, privacy, and/or property security, after collecting the input operation, when the input operation is determined to be performed on the second object, it may be necessary to perform the user information authentication before using the function. The user information may be authenticated based on the authentication information and the second operation information showing that the input operation can be responded after the user information authentication is passed may be generated. The second object may be operated only when the authentication information matches the preset user information.

In the present disclosure, the object on which the input operation is performed may be determined when the input operation is obtained. In response to the input operation being performed on the first object in the first region, the first object may respond to the input operation directly based on the first operation information. In response to the input operation being performed on the second object in the second region, the second object may respond to the input operation based on the second operation information and the corresponding authentication information. Correspondingly, a mode in which an object responds to the input operation may be determined based on a region where the object is located. Whether it is necessary to perform the user information authentication when the object responses to the input operation may be determined. Quick and simple operations may be performed on the first object in the first region. Correspondingly, authentication modes, operation modes, and response modes in the electronic device may be more diversified and the security of the second object in the second region may be guaranteed. The operation of the electronic device may be simpler and more convenient, to improve the use experience.

Figure 2:
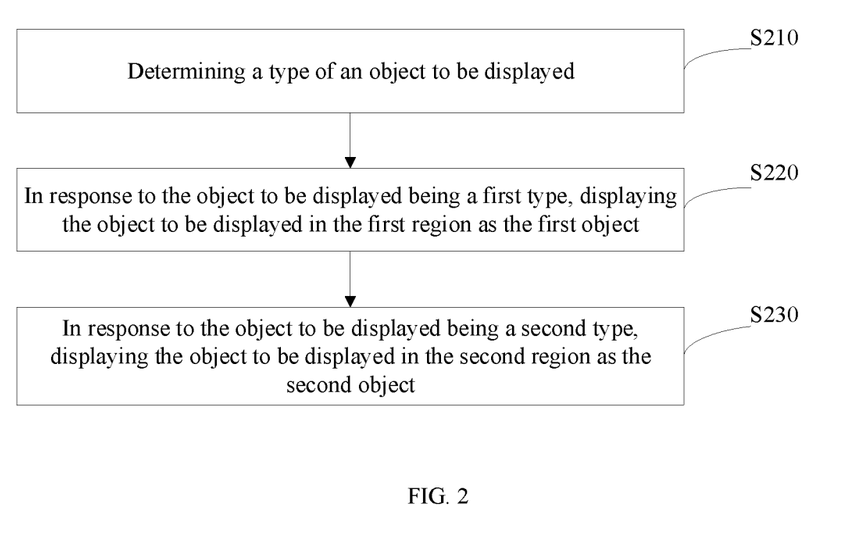
FIG. 2 illustrates a method for determining a display region of an object to be displayed according to some embodiments of the present disclosure.

FIG. 2 illustrates a method to determine a display region of an object to be displayed in an information processing method according to some disclosed embodiments of the present disclosure. In one embodiment, as illustrated in FIG. 2, before obtaining the input operation in S110, the method may include:

S210: determining a type of an object to be displayed;

S220: in response to the object to be displayed being a first type, displaying the object to be displayed in the first region as the first object; and S230: in response to the object to be displayed being a second type, displaying the object to be displayed in the second region as the second object.

First, it may be determined whether the object to be displayed belongs to the first type that does not involve the user's personal information or privacy, or belongs to the second type that involves the user's personal information or privacy. After determining the type of the object to be displayed, a display position of the object to be displayed may be chosen. The object to be displayed with the first type may be displayed in the first region as the first object, or the object to be displayed belong to the second type may be displayed in the second region as the second object.

In the present disclosure, the display position of the object to be displayed may be chosen after determining the type of the object to be displayed. Then it may be determined whether the input operation is needed to be responded based on the authentication information, according to the operation information corresponding to different display positions and responding to the input operation.

In one embodiment, whether the object to be displayed is the first type or the second type may be determined in two methods.

In a first method, whether the object to be displayed belongs to the first type or the second type may be determined based on an object classification to which the object to be displayed belongs. Every object may be ascribed to the first type or the second type. When the object classification to which the object to be displayed belongs is the second type, the object to be displayed may be displayed in the second region. When the object classification to which the object to be displayed belongs is the first type, the object to be displayed may be displayed in the first region. For example, a calendar function classification may be ascribed to the first type and a social function classification may be ascribed to the second type. Correspondingly, when the object to be displayed is any one function or application belonging to the calendar function classification, the object to be displayed may be displayed in the first region. When the object to be displayed is any function or application belonging to the social function classification, the object to be displayed may be displayed in the second region.

In a second method, whether the object to be displayed belongs to the first type or the second type may be determined based on whether the object to be displayed needs to collect the user information or preset sensitive words.

When the object to be displayed does not need to collect the user information, the object to be displayed may be assigned as the first type and may be displayed in the first region. When the object to be displayed needs to collect the user information before being used, the object to be displayed may be assigned as the second type and may be displayed in the second region. For example, the calendar function may be used without obtaining the user information and may be assigned as the first type to be displayed in the first region. QQ may be used after obtaining the user information and may be assigned as the second type to be displayed in the second region.

When the object to be displayed does not include the preset sensitive words, the object to be displayed may be assigned as the first type and may be displayed in the first region. When the object to be displayed includes the preset sensitive words, the object to be displayed may be assigned as the second type and may be displayed in the second region. For example, the preset sensitive words may include account names and/or passwords. Since the camera function may be used without logging into a personal account and may not involve the preset sensitive words, it may be assigned as the first type to be displayed in the first region. WeChat application may be used after logging into a personal account relevant to the preset sensitive words and may be assigned as the second type to be displayed in the second region.

In another embodiment, before obtaining the input operation in S110, the method may further include displaying the first object in the first region and displaying the second object in the second region.

The first region and the second region may be two local parts of the display region. The first object may belong to the first type and the second object may belong to the second type.

In one embodiment, the first region and the second region may be disposed in the display region simultaneously. For example, the display region may display the first region and the second region simultaneously, so the user may perform operations in both the first object and the second object according to the needs. In some embodiments, a shape of the first region and a shape of the second region may be same or different. A size of the first region and a size of the second region may be same or different. A total area occupied by the first region and the second region may or may not completely occupy the display region. The first region and the second region may be disposed from left to region, or from top to bottom, or may be disposed interlaced. The present disclosure has no limit on the arrangement of the first region and the second region. The first region and the second region may be arranged according to the user's preference.

In another embodiment, the first region and the second region may not be disposed in the display region simultaneously. For example, the display panel may show the first region in a first time and the second region in a second time, so the user may perform operations on the first object and the second project respectively according to the needs. The first region and the second region may have a same shape and may completely occupy the display region respectively.

In one embodiment, the first type may correspond to a first authority and the second type may correspond to a second authority. Since the second type may correspond to objects relevant to the user's personal information or privacy, the second authority may be a higher authority. Since the first type may correspond to objects not involving the user's personal information or privacy, the first authority may be a lower authority. The second authority may be higher than the first authority, and the user information may be authenticated before the second object responds to the input operation with the second authority. When the authentication information matches the preset user information, the object belonging to the second type may be operated. With the first authority, the object belonging to the first type may be operated directly without the user information authentication.

In the present disclosure, the different objects may correspond to different authorities. After obtaining the input operation and determining whether the operated object is the first object or the second object, corresponding operating information may be generated according to the authority of the different object type, to distinguish whether the user information authentication is necessary according to the authentication. Security of the object with the higher authority may be improved, and the operation to the object with the lower authority may be simplified.

In one embodiment, the first operation information may be the operation information corresponding to the first object in the first region, and the second operation information may be the operation information corresponding to the second object in the second region. In response to the input operation being performed to the first object and the input operation is the operation in the first region, the first object may be processed based on the first operation information in the first region to respond to the input operation directly. In response to the input operation being performed to the second object and the input operation is the operation in the second region, the second object may be processed based on the second operation information in the second region and the corresponding authentication information and may respond to the input operation.

For example, when the input operation is an operation of the user to open the calendar function, the first operation information may be obtained and the calendar function may be opened directly based on the input operation since the calendar function may be a first object. When the input operation is an operation of the user to view push messages of a WeiBo application, the second operation information including the preset user information may be obtained and the input operation may be responded to open the push messages when the authentication information inputted by the user matches the preset user information since the WeiBo application may be a second object.

In response to the input operation being an operation to move an object in the first region or in the second region into another region, corresponding third operation information may be collected and the object may respond to the input operation based on the third operation information and authentication information corresponding to the third operation information.

Since the electronic device may classify the object to be displayed based on the object classification or the preset sensitive words using a mechanical classification, an object with a lower authority by the user may be determined to belong to the second type and may be displayed in the second region, or an object with a higher authority by the user may be determined to belong to the first type and may be displayed in the first region. The third operation information corresponding to the input operation for moving an object in the first region or in the second region into another region may be obtained. For example, when the user downloads and installs a notebook function, the notebook function may be determined as the first type and be displayed in the first region since the notebook function may not involve the personal information and not include the preset sensitive words. When the user saves note contents into the notebook function, the user may consider that a higher authority is needed to open the notebook function. The user may perform an input operation on the notebook function displayed in the first region to move the notebook function into the second region. Since the authority of the object may be changed by the user, the input operation may be performed after authenticating the user information.

In one embodiment, moving the first object from the first region to the second region, and/or moving the second object from the second region to the first region, may be achieved by dragging one corresponding object from one region to another region. In other embodiments, moving the first object from the first region to the second region, and/or moving the second object from the second region to the first region, may be achieved by selecting a moving the object function to drag one corresponding object from one region to another region.

In some embodiments, the authentication information corresponding to the third input operation may be same as the authentication information corresponding to the second input operation, and may include character information, fingerprint information, or human face information. In some other embodiments, a security level of the authentication information corresponding to the third input operation may be higher than a security level of the authentication information corresponding to the second input operation. For example, the authentication information corresponding to the second input operation may include the character information and/or the fingerprint information, and the authentication information corresponding to the third input operation may include the human face information. In another example, the authentication information corresponding to the second input operation may include the fingerprint information, and the authentication information corresponding to the third input operation may include the character information and the fingerprint information.

The third input operation may change a display position of an object and different display positions may correspond to different authority. The first region may correspond to the object with a lower authority and the object in the first region may be operated without the user information authentication. The second region may correspond to the object with a higher authority and the object in the second region may be operated after the user information authentication. When changing a display position of an object, the object which does not require the user information authentication initially may become the object requiring the user information authentication, or the object requiring the user information authentication initially may become the object which does not require the user information authentication. When this operation is not performed by the user itself, the user information or privacy may leak out. Correspondingly, when the input operation is the third input operation, the user information may be authenticated.

In one embodiment, the authentication information corresponding to the third input operation may be same as the authentication information corresponding to the second input operation. Correspondingly, a requirement on the user information authentication may be satisfied and the authentication may be used to determine whether the operator is the user itself. In some other embodiments, a security level of the authentication information corresponding to the third input operation may be configured higher than a security level of the authentication information corresponding to the second input operation, to enhance the security. Correspondingly, multiple authentications may be used to determine whether the operator is the user itself, and the security of the electronic device may be improved further.

Figure 3:
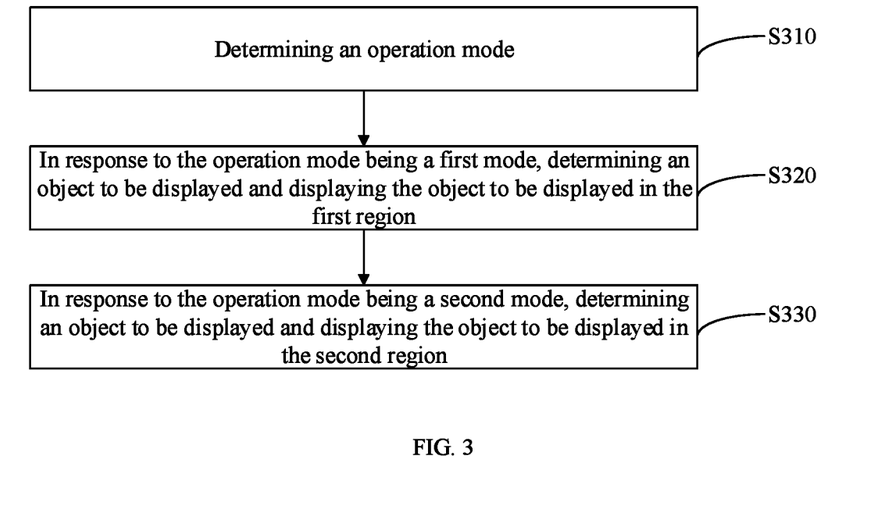
FIG. 3 illustrates another method for determining a display region of an object to be displayed according to some embodiments of the present disclosure.

FIG. 3 illustrates another method to determine a display region of a display object in an information processing method provided by another embodiment. As illustrated in FIG. 3, in one embodiment, before obtaining the input operation in S110, the method may include:

S310: determining an operation mode;

S320: in response to the operation mode being a first mode, determining the object to be displayed and displaying the object to be displayed in the first region; and S330: in response to the operation mode being a second mode, determining the object to be displayed and displaying the object to be displayed in the second region.

An authority of the first mode may be higher than an authority of the second mode, and the first mode and the second mode may be switched to each other by verifying the information.

The first mode may be a mode with a higher authority, such as a user mode or an unlocking mode. Since the user information is authenticated before obtaining the input operation, all object to be displayed may be displayed in the first region. The second mode may be a mode with a lower authority, such as a guest mode or a screen locking mode. All object to be displayed may be displayed in the second region. When switching from the second mode to the first mode, the authentication information may be input, and the second mode may be switched into the first mode when the authentication information matches the preset user information.

In one embodiment, the first region and the second region may not be displayed in the display region simultaneously. Instead, according to the operation mode, the first region or the second region may be displayed in the corresponding working mode. The first region and the second region may completely occupy the display region respectively.

In some other embodiments, in the second mode, the first region and the second region may be displayed in the display region simultaneously, so that the first object and the second object may be displayed in the display region simultaneously. Correspondingly, an object corresponding to the input operation may be determined, and then the input operation may be determined to require or not require the user information authentication based on the operation information corresponding to different objects. The operation mode with a lower authority may be the guest mode or the screen locking mode.

In the current technology, when the electronic device is in the guest mode or the screen locking mode, because the electronic device has a protective function, the user information authentication may be required for the user to enter a corresponding application through pushed messages from the application except for a clock function, an emergency call function, and a camera function. Correspondingly, even for an application not involving the user's personal information or privacy, the user information authentication may be required for the user to enter a mode with a higher authority and then enter the corresponding application. The user's operating procedure may become complex and the user's requirement on the intelligent electronic device.

In the present disclosure, when the electronic device is in the guest mode or the screen locking mode, an object corresponding to the input operation may be determined after obtaining the input operation. in response to the input operation being performed on the first object displayed in the first region with a lower authority, the first object may respond to the input operation directly based on the first operation information. in response to the input operation being performed on the second object displayed in the second region with a higher authority, the second object may respond to the input operation based on the second operation information and the corresponding authentication information. Correspondingly, when the electronic device is in a lower authority mode, only the second object with a higher authority may switch the operation mode according to the authentication mode to change the electronic device to a higher authority mode after performing the input operation, and then respond to the input operation. The first object with a lower authority may still respond to the input operation directly. The first object with a lower authority may be operated quickly and simply. The operation of the electronic device may be simpler and more convenient under the premise of ensuring the security of the second object. The use experience may be improved.

Figure 4:
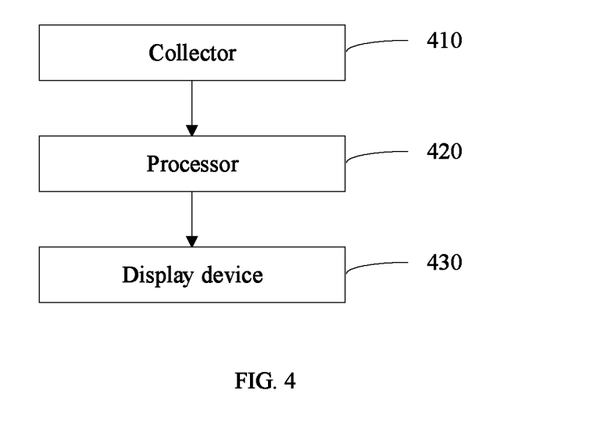
FIG. 4 illustrates an information processing device according to some embodiments of the present disclosure.

FIG. 4 illustrates an information processing device according to some disclosed embodiments of the present disclosure.

In one embodiment, as illustrated in FIG. 4 the information processing device may include a collector 410 and a processor 420.

The collector 410 may be used to collect the input operation and the authentication information.

The processor 420 may be used to collect operation information. In response to the input operation being performed on the first object displayed in the first region with a lower authority, the first operation information may be collected and the first object may respond to the input operation directly based on the first operation information. In response to the input operation being performed on the second object displayed in the second region with a higher authority, the second operation information may be collected, and the second object may respond to the input operation based on the second operation information and the authentication information corresponding to the second operation information.

In the present disclosure, the collector 410 may be used to obtain the input operation, and the processor 420 may determine an object corresponding to the input operation. in response to the input operation being performed on the first object displayed in the first region with a lower authority, the first operation information showing that the user information authentication is unnecessary and the input operation can be responded directly may be collected. The first object may respond to the input operation directly based on the first operation information. In response to the input operation being performed on the second object displayed in the second region with a higher authority, the second operation information showing that the input operation can be responded after the user information authentication may be collected. When the processor 420 processes the second operation information, the authentication information corresponding to the second operation information may be collected. The authentication information corresponding to the second operation information may be fingerprint information, human face information, character information, or a combination thereof. The user information authentication may be passed when the authentication information matches the preset user information.

In one embodiment, the object corresponding to the input operation may be a function provided by the electronic device itself, or an application added into the electronic device by the user.

The first region may be used to display the first object and the first object may be an object that is not related to personal information and privacy of a user. The first object may be a function that the electronic device itself has, such as a camera function, a dialing function, a calendar function. The first object may also be an application that is installed by the user and that does not include the user's personal information or the user privacy such as a weather application, a map application, and an image processing application. Since the object does not include the user's personal information or the user privacy, after collecting the input operation, when the input operation is determined to be performed on the first object, the first operation information showing that a user information authentication is unnecessary and the input operation can be responded directly may be achieved to make the first object response to the input operation directly without performing the user information authentication.

The second region may be used to display the second object. The second object may be relevant to the user's personal information, privacy, and/or property security. The second object may be a function that the electronic device itself has, such as an album function, a message function, or a notebook function. The second object may also be an application that is installed by the user and that is relevant to the user's personal information, the user privacy, and/or property security, such as a social application, a game application, a payment application, a shopping application, or a financial application. Since the second object may be relevant to the user's personal information, privacy, and/or property security, after collecting the input operation, when the input operation is determined to be performed on the second object, it may be necessary to perform the user information authentication before using the function. The user information may be authenticated based on the authentication information and the second operation information showing that the input operation can be responded after the user information authentication is passed may be generated. The second object may be operated only when the authentication information matches the preset user information.

In the present disclosure, a response mode to the input operation of an object may be determined based on a display region where the object is located. Whether the user information authentication is required when the object responds to the input operation may be determined then. The first object with a lower authority may be operated quickly and simply. Under the premise of ensuring the security of the second object in the second region, the authentication mode, the operation mode, and the response mode of the objects in the electronic device may be more diverse. The operation of the electronic device may be simpler and more convenient, and the use experience may be improved.

As illustrated in FIG. 4, the device may further include a display device 430. The processor 420 may determine whether an object to be displayed belongs to the first type or the second type, and then the object to be displayed may be displayed in the first region or in the second region accordingly.

The first region in the display device 430 may be used to display the first object and the first object may be an object that is not related to personal information and privacy of a user. The first object may be a function that the electronic device itself has, such as a camera function, a dialing function, a calendar function. The first object may also be an application that is installed by the user and that does not include the user's personal information or the user privacy such as a weather application, a map application, and an image processing application. Since the first object does not include the user's personal information or the user privacy, the first object may be used directly without performing the user information authentication.

The second region in the display device 430 may be used to display the second object. The second object may be relevant to the user's personal information, privacy, and/or property security. The second object may be a function that the electronic device itself has, such as an album function, a message function, or a notebook function. The second object may also be an application that is installed by the user and that is relevant to the user's personal information, the user privacy, and/or property security, such as a social application, a game application, a payment application, a shopping application, or a financial application. Since the second object may be relevant to the user's personal information, privacy, and/or property security, it may be necessary to perform the user information authentication before using the second object. The user information may be authenticated based on the authentication information and the second operation information showing that the input operation can be responded after the user information authentication is passed may be generated. The second object may be operated only when the authentication information matches the preset user information.

In one embodiment, the first region and the second region may be disposed in the display region of the display device 430 simultaneously. For example, the display region may display the first region and the second region simultaneously, so the user may perform operations in both the first object and the second object according to the needs. In some embodiments, a shape of the first region and a shape of the second region may be same or different. A size of the first region and a size of the second region may be same or different. A total area occupied by the first region and the second region may or may not completely occupy the display region. The first region and the second region may be disposed from left to region, or from top to bottom, or may be disposed interlaced. The present disclosure has no limit on the arrangement of the first region and the second region. The first region and the second region may be arranged according to the user's preference.

In another embodiment, the first region and the second region may not be disposed in the display region of the display device 430 simultaneously. For example, the display panel may show the first region in a first time and the second region in a second time, so the user may perform operations on the first object and the second project respectively according to the needs. The first region and the second region may have a same shape, and may completely occupy the display region respectively.

In one embodiment, whether the object to be displayed belongs to the first type or the second type may be determined in two methods by the processor 420.

In a first method, whether the object to be displayed belongs to the first type or the second type may be determined based on an object classification to which the object to be displayed belongs. Every object may be ascribed to the first type or the second type, when the object classification to which the object to be displayed belongs is the second type, the object to be displayed may be displayed in the second region, when the object classification to which the object to be displayed belongs is the first type, the object to be displayed may be displayed in the first region. For example, a calendar function classification may be ascribed to the first type and a social function classification may be ascribed to the second type. Correspondingly, when the object to be displayed is any one function or application belonging to the calendar function classification, the object to be displayed may be displayed in the first region, when the object to be displayed is any one function or application belonging to the social function classification, the object to be displayed may be displayed in the second region.

In a second method, whether the object to be displayed belongs to the first type or the second type may be determined based on whether the object to be displayed needs to obtain the user information or preset sensitive words.

When the object to be displayed does not need to obtain the user information, the object to be displayed may be assigned as the first type and may be displayed in the first region, when the object to be displayed needs to obtain the user information before being used, the object to be displayed may be assigned as the second type and may be displayed in the second region. For example, the calendar function may be used without obtaining the user information and may be assigned as the first type to be displayed in the first region. QQ may be used after obtaining the user information and may be assigned as the second type to be displayed in the second region.

If the object to be displayed does not include the preset sensitive words, the object to be displayed may be assigned as the first type and may be displayed in the first region, when the object to be displayed includes the preset sensitive words, the object to be displayed may be assigned as the second type and may be displayed in the second region. For example, the preset sensitive words may include account names and/or passwords. Since the camera function may be used without logging into a personal account and may not involve the preset sensitive words, it may be assigned as the first type to be displayed in the first region. WeChat application may be used after logging into a personal account relevant to the preset sensitive words and may be assigned as the second type to be displayed in the second region.

In one embodiment, the first type may correspond to a first authority and the second type may correspond to a second authority. Since the second type may correspond to objects relevant to the user's personal information or privacy, the second authority may be a higher authority. Since the first type may correspond to objects not involving the user's personal information or privacy, the first authority may be a lower authority. The second authority may be higher than the first authority, and the user information may be authenticated before the second object responds to the input operation with the second authority. When the authentication information matches the preset user information, the object belonging to the second type may be operated. With the first authority, the object belonging to the first type may be operated directly without the user information authentication.

In one embodiment, the collector 410 may be used to collect the third operation information corresponding to an operation for moving an object in the first region or in the second region into another region. Then the processor 420 may make the object respond to the input operation based on the third operation information and authentication information corresponding to the third operation information.

In some embodiments, the authentication information corresponding to the third input operation may be same as the authentication information corresponding to the second input operation, and may include character information, fingerprint information, or human face information. In some other embodiments, a security level of the authentication information corresponding to the third input operation may be higher than a security level of the authentication information corresponding to the second input operation. For example, the authentication information corresponding to the second input operation may include the character information and/or the fingerprint information, and the authentication information corresponding to the third input operation may include the human face information. In another example, the authentication information corresponding to the second input operation may include the fingerprint information, and the authentication information corresponding to the third input operation may include the character information and the fingerprint information.

The third input operation may change a display position of an object and different display positions may correspond to different authorities. The first region may correspond to the object with a lower authority and the object in the first region may be operated without the user information authentication. The second region may correspond to the object with a higher authority and the object in the second region may be operated after the user information authentication. When changing a display position of an object, the object which does not require the user information authentication initially may become the object requiring the user information authentication, or the object requiring the user information authentication initially may become the object which does not require the user information authentication. When this operation is not performed by the user itself, the user information or privacy may leak out. Correspondingly, when the input operation is the third input operation, the user information may be authenticated.

In one embodiment, the authentication information corresponding to the third input operation may be same as the authentication information corresponding to the second input operation. Correspondingly, a requirement on the user information authentication may be satisfied and the authentication may be used to determine whether the operator is the user itself. In some other embodiments, a security level of the authentication information corresponding to the third input operation may be configured higher than a security level of the authentication information corresponding to the second input operation, to enhance the security. Correspondingly, a multiple authentication may be used to determine whether the operator is the user itself, and the security of the electronic device may be improved further.

In some embodiments, the processor 420 may be used to determine the operation mode of the information processing device In response to the operation mode being a first mode, the object to be displayed may be displayed in the first region; and in response to the operation mode being a second mode, the object to be displayed may be displayed in the second region.

The first mode may be a mode with a higher authority, such as a user mode or an unlocking mode. Since the user information is authenticated before obtaining the input operation, all object to be displayed may be displayed in the first region. The second mode may be a mode with a lower authority, such as a guest mode or a screen locking mode. All object to be displayed may be displayed in the second region, when switching from the second mode to the first mode, the authentication information may be input, and the second mode may be switched into the first mode when the authentication information matches the preset user information.

In one embodiment, the first region and the second region may not be displayed in the display region of the display device 430 simultaneously. Instead, according to the operation mode, the first region or the second region may be displayed in the corresponding working mode. The first region and the second region may completely occupy the display region of the display device 430 respectively.

In some other embodiments, when the information processing device is working in the second mode with a lower authority, the display region of the display device 430 may include two different parts, i.e. the first region and the second region. The first object may be displayed in the first region and the second object may be displayed in the second region. The first object and the second object may be displayed in the display device 430 simultaneously. Correspondingly, the user may operate both the first object and the second object according to the needs.

In some embodiments, the disclosed information processing device may further include a memory configured to store instructions corresponding to the disclosed information processing methods. The processor may be coupled with the memory. When the instructions being executed, the processor may be configured to perform the disclosed information processing methods. In some embodiments, the disclosed information processing device may be any suitable computing device configured to at least perform the disclosed information processing methods.

Figure 5:
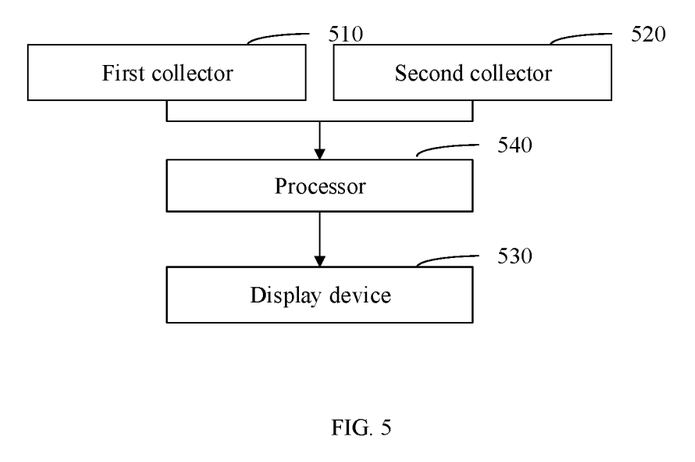
FIG. 5 illustrates an electronic device according to some embodiments of the present disclosure.

FIG. 5 illustrates an electronic device according to some disclosed embodiments of the present disclosure.

As illustrated in FIG. 5, in one embodiment, the electronic device may include a first collector 510 for obtaining the input operation, a second collector 520 for collecting the authentication information, a display device 530 for displaying the first object in the first region and displaying the second object in the second region, and one or more processors 540 for responding the input operation.

In response to the input operation being performed on the first object, the first operation information may be collected and the first object may respond to the input operation directly based on the first operation information. In response to the input operation being performed on the second object displayed in the second region, the second operation information may be collected, and the second object may respond to the input operation based on the second operation information and the authentication information corresponding to the second operation information.

In the present disclosure, the first collector 510 may be used to obtain the input operation, and the one or more processors 540 may determine an object corresponding to the input operation. In response to the input operation being performed on the first object, the first operation information showing that the user information authentication is unnecessary and the input operation can be responded directly may be collected. The first object may respond to the input operation directly based on the first operation information.

In response to the input operation being performed on the second object displayed in the second region with a higher authority, the second operation information showing that the input operation can be responded after the user information authentication may be collected. When processing the second operation information, the one or more processors 540 may obtain the authentication information corresponding to the second operation information through the second collector 520. The authentication information corresponding to the second operation information may be fingerprint information, human face information, character information, or a combination thereof. The user information authentication may be passed when the authentication information matches the preset user information.

In one embodiment, the one or more processors 540 may be also used to determine whether the object to be displayed belongs to the first type or the second type, and display the object to be displayed in the first region or the second region of the display device 530 accordingly.

In one embodiment, the first collector 510, the second collector 520, and the display device 530 may be configured in two configurations.

In a first configuration, the first collector 510 and the display device 530 may together form a touch display device. The touching display device may be used to achieve the collecting of the input operation and the display of objects simultaneously, while the collecting of the authentication information may be achieved by using the second collector 520 as a specific authentication information collector. For example, a fingerprint collector may collect the fingerprint information and a camera may collect the human face information. The fingerprint collector may be a screen fingerprint collector, or a fingerprint collector disposed in an operation key.

In a second configuration, the first collector 510, the second collector 520, and the display device 530 may together form a touch display device. The touch display device may be used to achieve the collection of the input operation, the collect of the authentication information, and the display of objects simultaneously.

In the present disclosure, the object on which the input operation is performed may be determined when the input operation is obtained. In response to the input operation being performed on the first object in the first region, the first object may respond to the input operation directly based on the first operation information. In response to the input operation being performed on the second object in the second region, the second object may respond to the input operation based on the second operation information and the corresponding authentication information. Correspondingly, a mode in which an object responds to the input operation may be determined based on a region where the object is located. That is whether it is necessary to perform the user information authentication when the object responses to the input operation may be determined. Quick and simple operations may be performed to the first object in the first region. Correspondingly, authentication modes, operation modes, and response modes in the electronic device may be more diversified when the security of the second object in the second region may be guaranteed. The operation of the electronic device may be simpler and more convenient, to improve the use experience.

In some embodiments, the disclosed electronic device may further include a memory configured to store instructions corresponding to the disclosed information processing methods. The one or more processors of the electronic device may be coupled with the memory. When the instructions being executed, the processor may be configured to perform the disclosed information processing methods.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An information processing method, comprising:
    obtaining an input operation on a display region;
    in response to the input operation being performed on a first object displayed in a first region of a display region, collecting first operation information and making the first object respond to the input operation according to the first operation information; and
    in response to the input operation being performed on a second object displayed in a second region of the display region, collecting second operation information, collecting authentication information of a user corresponding to the second operation information, and making the second object respond to the input operation according to the second operation information upon determining that the authentication information corresponding to the second operation information matches preset user information, wherein collecting the authentication information corresponding to the second operation information includes collecting at least one of biometric information or character information,
    wherein:
    the first operation information is operation information in the first region;
    the second operation information is operation information in the second region; and
    the method further comprises:
    in response to the input operation corresponding to third operation information for moving an object from one of the first region and the second region into another of the first region and the second region, collecting authentication information of the user corresponding to the third operation information; and making the object respond to the input operation based on the third operation information upon determining that the authentication information corresponding to the third operation information matches the preset user information.

2. The method according to claim 1, before obtaining the input operation, further including:
    determining a type of an object to be displayed;
    in response to the object to be displayed being a first type, displaying the object to be displayed in the first region as the first object; and
    in response to the object to be displayed being a second type, displaying the object to be displayed in the second region as the second object.

3. The method according to claim 2, wherein:
    the first type corresponds to a first authority and the second type corresponds to a second authority higher than the first authority.

4. The method according to claim 1, before obtaining the input operation, further including:
    displaying the first object in the first region, and displaying the second object in the second region, wherein:
    the first region and the second region are two different portions of the display region;
    the first object corresponds to a first type; and
    the second object corresponds to a second type.

5. The method according to claim 4, wherein:
the first type corresponds to a first authority and the second type corresponds to a second authority higher than the first authority.

6. The method according to claim 1, before obtaining the input operation, further including:
determining an operation mode;
in response to the operation mode being a first mode, determining an object to be displayed and displaying the object to be displayed in the first region; and
in response to the operation mode being a second mode, determining the object to be displayed and displaying the object to be displayed in the second region, wherein:
the first mode has an authority higher than the second mode; and
the first mode and the second mode are capable of being switched to each other through the authentication information.

7. An information processing device, comprising:
a collector, configured for obtaining an input operation and collecting authentication information, the authentication information being at least one of biometric information or character information;
a memory, configured to store instructions corresponding to an information processing method;
a processor, coupled with the memory and, when executing the instructions, configured to perform:
in response to the input operation being performed on a first object displayed in a first region of a display region, collecting first operation information and making the first object respond to the input operation according to the first operation information; and
in response to the input operation being performed on a second object displayed in a second region of the display region, collecting second operation information, collecting authentication information corresponding to the second operation information, and making the second object respond to the input operation according to the second operation information upon determining that the authentication information corresponding to the second operation information matches preset user information,
wherein:
the first operation information is operation information in the first region;
the second operation information is operation information in the second region; and
the processor is further configured to perform:
in response to the input operation corresponding to third operation information for moving an object from one of the first region and the second region into another of the first region and the second region, collecting authentication information of the user corresponding to the third operation information; and making the object respond to the input operation based on the third operation information upon determining that the authentication information corresponding to the third operation information matches the preset user information.

8. The device according to claim 7, wherein further including:
a display device configured for displaying the first object in the first region and the second object in the second region.

9. The device according to claim 7, wherein the collector and the display device together form a touch display device.

10. The device according to claim 7, wherein the processor is further configured to perform:
determining a type of an object to be displayed;
in response to the object to be displayed being a first type, displaying the object to be displayed in the first region as the first object; and
in response to the object to be displayed being a second type, displaying the object to be displayed in the second region as the second object.

11. The device according to claim 10, wherein:
the first type corresponds to a first authority and the second type corresponds to a second authority higher than the first authority.

12. The device according to claim 7, the processor is further configured to perform:
displaying the first object in the first region, and displaying the second object in the second region, wherein:
the first region and the second region are two different portions of the display region;
the first object corresponds to a first type; and
the second object corresponds to a second type.

13. The device according to claim 12, wherein:
the first type corresponds to a first authority and the second type corresponds to a second authority higher than the first authority.

14. The device according to claim 7, wherein the processor is further configured to perform:
determining an operation mode;
in response to the operation mode being a first mode, determining an object to be displayed and displaying the object to be displayed in the first region; and
in response to the operation mode being a second mode, determining the object to be displayed and displaying the object to be displayed in the second region; wherein:
the first mode has an authority higher than the second mode; and
the first mode and the second mode are capable of being switched to each other through the authentication information.

15. The device according to claim 7, wherein the information processing device is an electronic device.

16. The method according to claim 1, wherein:
a security level of the authentication information corresponding to the third input operation is higher than a security level of the authentication information corresponding to the second input operation.

17. The method of claim 1, wherein:
the first object and the second object are different applications installed on an electronic device.

18. The method according to claim 1, wherein:
the first object is not related to personal information or privacy of the user; and
the second ojbect is relevant to personal information, privacy, and/or property security of the user.

* * * * *